US012394934B2

(12) United States Patent
Lee

(10) Patent No.: US 12,394,934 B2
(45) Date of Patent: Aug. 19, 2025

(54) POWER CONNECTOR WITH WATERPROOF FUNCTION

(71) Applicant: Hiu Piu Lee, Zhejiang (HK)

(72) Inventor: Hiu Piu Lee, Zhejiang (HK)

( * ) Notice: Subject to any disclaimer, the term of this patent is extended or adjusted under 35 U.S.C. 154(b) by 363 days.

(21) Appl. No.: 18/151,087

(22) Filed: Jan. 6, 2023

(65) Prior Publication Data

US 2024/0213710 A1 Jun. 27, 2024

(30) Foreign Application Priority Data

Dec. 27, 2022 (CN) ........................ 202211680584.2

(51) Int. Cl.
*H01R 13/514* (2006.01)
*H01R 13/52* (2006.01)

(52) U.S. Cl.
CPC ......... *H01R 13/521* (2013.01); *H01R 13/514* (2013.01); *H01R 13/5213* (2013.01)

(58) Field of Classification Search
None
See application file for complete search history.

(56) References Cited

U.S. PATENT DOCUMENTS 5,634,808 A * 6/1997 Shinji ................ H01R 13/5219 439/271
5,795,176 A 8/1998 Blaetz
6,435,911 B1 * 8/2002 Payson .................. H01R 43/24 439/344
8,651,887 B2 * 2/2014 Zhang .................... H01R 24/38 439/352
9,496,658 B1 * 11/2016 Chiu .................. H01R 13/6658
11,146,029 B1 10/2021 Shaffer et al.
11,329,421 B2 5/2022 Chen
2017/0288335 A1 10/2017 Hsu
2022/0077628 A1 3/2022 Roewekaemper et al.
2022/0360015 A1 * 11/2022 Cremezi ................ H01R 13/44

FOREIGN PATENT DOCUMENTS

CN 105720420 A * 6/2016
CN 110444957 A * 11/2019 ........... H01R 13/502
CN 115207720 A * 10/2022
CN 115513706 A * 12/2022
WO WO-2007040013 A1 * 4/2007 ......... H01R 13/5219

* cited by examiner

*Primary Examiner* — Tho D Ta

(57) ABSTRACT

Provided is a power connector with a waterproof function. A waterproof piece is slideably sleeved at the periphery of a plug. An annular flange is formed on an inner edge of one end of the waterproof piece. A first sealing ring matched with the annular flange is mounted on an outer edge of the plug. Sealing structures matched with each other are respectively arranged on an outer edge of a socket and an inner edge of one end, away from the annular flange, of the waterproof piece. When the waterproof piece is mounted on the socket through the sealing structures, an internal space of the waterproof piece is sealed through the matching between the annular flange and the first sealing ring and the matching between the sealing structures, so that a sealed space is formed in the waterproof piece.

8 Claims, 6 Drawing Sheets

POWER CONNECTOR WITH WATERPROOF FUNCTION

TECHNICAL FIELD

The present invention relates to the technical field of a power connector, and in particular to a power connector with a waterproof function.

BACKGROUND

Traditional power connectors are mainly divided into household power strips and drag sockets special for engineering, which are mainly used to enlarge the application range of power supplies to meet the use requirements of the power supplies. However, the traditional power connectors have a very serious defect and do not have a waterproof property basically, so that users need to place the power connectors in a safer place, and the risk of electric shock will easily occur if they are slightly negligent. In daily life or engineering construction, the power strip connected to the power supply is generally hung on the wall so as to avoid the risk of electric shock caused by contact with water on the ground. Although the power strip can be effectively prevented from being in contact with water, the technical problem that the power connector is not waterproof cannot be solved fundamentally. If the power connector is not taken back timely in thunderstorm weather, or water leaks from a water pipe leaks and splashes on the power strip on the wall, so that the power connector hung on the wall still has the risk of electric shock.

Therefore, it is urgent to provide a power connector with a waterproof function.

SUMMARY

According to the above technical problem, the present invention provides a power connector with a waterproof function, which is mainly used to seal a joint of a plug and a socket in a sealing structure to achieve a waterproof effect. Meanwhile, after a waterproof piece is connected to the sealing structure on the socket, danger or unnecessary electrical disconnection caused by the fact that the plug is separated from the socket under the action of an external force can be avoided.

According to the above technical problem to be solved, the following technical solution is put forward:

The present invention provides a power connector with a waterproof function, including a plug and a socket for connecting the plug, wherein a waterproof piece is slideably sleeved at the periphery of the plug; an annular flange with a diameter less than a maximum diameter of an outer edge of the plug is formed on an inner edge of one end of the waterproof piece; a first sealing ring matched with the annular flange is mounted on an outer edge of the plug; sealing structures matched with each other are respectively arranged on an outer edge of the socket and an inner edge of one end, away from the annular flange, of the waterproof piece; and when the waterproof piece is mounted on the socket through the sealing structures, an internal space of the waterproof piece can be sealed through the mutual matching between the annular flange and the first sealing ring and the mutual matching between the sealing structures.

By adoption of the above structure, the joint of the plug and the socket is placed in the waterproof piece, and the internal space of the waterproof piece is sealed, so that the waterproof effect of the connector is achieved. Specifically, one end, close to the socket, of the waterproof piece is sealed by the sealing structure, and the waterproof piece moves towards the socket to press the annular flange against the first sealing ring to seal one end, close to the plug, of the waterproof piece, thereby forming a sealed space in the waterproof piece. Meanwhile, after the waterproof piece is in matched connection with the sealing structure on the socket, electrical disconnection caused by the fact that the plug is separated under the action of the external force can be avoided.

Further, the sealing structures include an external thread structure arranged on the outer edge of the socket, and an internal thread structure arranged on an inner edge of the waterproof piece; and the internal thread structure is matched with the external thread structure.

By adoption of the above structure, the internal thread structure on the waterproof piece can be screwed into the external thread structure on the socket, thereby achieving a good sealing effect through the thread structures. Under the mutual matching between the thread structures, the electrical disconnection between the plug and the socket under the action of the external force can be avoided.

Further, antiskid protruding edges are respectively arranged on an outer edge of the waterproof piece and the outer edge of the socket circumferentially, each of the antiskid protruding edges located on the waterproof piece extends along an axial direction of the waterproof piece to form a strip-shaped structure, and each of the antiskid protruding edges located on the socket extends along an axial direction of the socket to form a strip-shaped structure.

By adoption of the above structure, the extending direction of each antiskid protruding edge is matched with the rotating directions of the waterproof piece and the socket to increase the friction force, so that the waterproof piece can screw in and out of the socket.

Further, a sealing ring mounting groove for locating the first sealing ring is formed at the periphery of the plug.

By adoption of the above structure, the sealing ring mounting groove is provided for preventing the annular flange from applying pressure to the sealing ring mounting groove, thereby ensuring that the first sealing ring will not move easily and two ends of the waterproof piece can be sealed effectively.

Further, the power connector includes at least one socket, wherein each socket is provided with a waterproof cover with a built-in thread structure, and the thread structure on an inner edge of the waterproof cover is matched with the external thread structure on the socket.

By adoption of the above structure, the waterproof cover can ensure that the idle socket also has the waterproof property. When the power connector is provided with a plurality of sockets, the waterproof covers are mounted on the idle sockets, thereby avoiding the unnecessary risk of electric shock.

Further, each waterproof cover is arranged beside the corresponding socket through a mounting ring belt, one end of the mounting ring belt is rotatably mounted at the top of the waterproof cover through a rotary knob, the other end of the mounting ring belt is sleeved on a peripheral surface of the corresponding socket, and the mounting ring belt is made of an elastic material or a flexible material.

By adoption of the above structure, the mounting ring belt is connected beside the socket, so that the waterproof cover can be prevented from being lost. The mounting ring belt is made of an elastic or flexible material, so that the waterproof cover can be in butt joint with the corresponding socket.

Further, a second sealing ring is sleeved at the tail end position of the external thread structure on each socket.

By adoption of the above structure, the waterproof property of the thread sealing structure can be further improved, thereby avoiding the influence on the normal work of the power connector by the fact that a small amount of water enters the thread sealing structure after long-term immersion.

Further, the sealing structures include e a second sealing ring fixedly mounted on the outer edge of the socket, and a waterproof ring groove formed in an inner edge of the waterproof piece, wherein the waterproof ring groove has a size matched with an outer edge size of the second sealing ring and is used to embedding the second sealing ring.

By adoption of the above structure, the sealing structure is composed of the waterproof ring groove and the second sealing ring. When the waterproof piece slides towards the socket and is sleeved at the periphery of the socket, the second sealing ring can be embedded into the waterproof ring groove, so that one end, close to the socket, of the waterproof piece is sealed. Meanwhile, electrical disconnection between the plug and the socket under the action of the external force can be avoided under the action of interference fit between the second sealing ring and the waterproof ring groove.

Further, a hanging ring for being placed on a hanger is arranged on one side of the socket.

By adoption of the above structure, the hanging ring is provided for hanging the power connector on the wall, thereby preventing the power connector from being immersed in water during use under the specific environment.

Compared with the prior art, the present invention has the following beneficial effects:

- by adoption of the power connector with the waterproof function according to the above technical solution, the joint of the plug and the socket is placed in the waterproof piece, sealing treatment is performed through the sealing structures arranged on the end part of one end of the waterproof piece and at the periphery of the socket, and when the annular flange at the other end of the waterproof piece presses against the first sealing ring at the periphery of the plug so as to perform sealing treatment on the other end of the waterproof piece and form a sealed space in the waterproof piece, thereby effectively preventing the joint of the plug and the socket from being in contact with water and achieving a good waterproof effect of the power connector; and after the waterproof piece sleeved on the outer edge of the plug and the sealing structure on the socket are locked and connected mutually, a very good anti-falling function is shown, so that the plug and the socket are electrically connected more reliably, the stability of the power supply is improved, and electrical disconnection between the plug and the socket caused by the action of the external force is effectively avoided.

BRIEF DESCRIPTION OF THE DRAWINGS

The drawings of the specification that constitutes a part of the present application are used to provide a further understanding of the present invention. The exemplary embodiments of the present invention and the description thereof are used to explain the present invention, and do not constitute an improper limitation of the present invention. In the drawings.

DETAILED DESCRIPTION OF THE EMBODIMENTS

Figure 1:
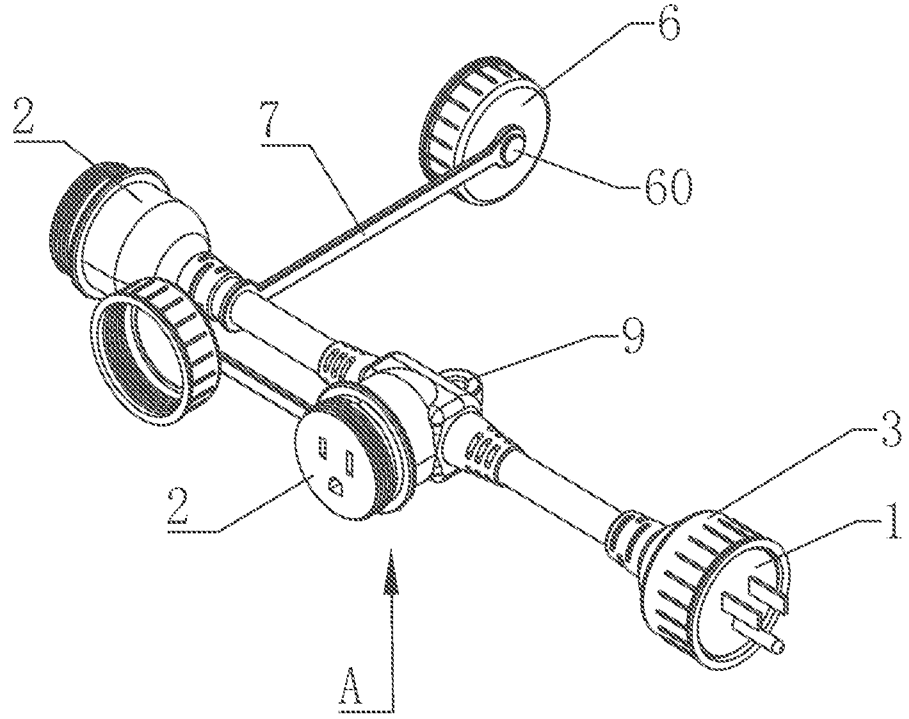
FIG. 1 is a three-dimensional structural schematic diagram of a power connector with a waterproof function according to the present invention serving as a power extension cable.

The present invention is described in detail below with reference to the accompanying drawings and embodiments. Each example is provided to explain the present invention instead of limiting the present invention. In fact, those skilled in the art will appreciate that modifications and variations may be made in the present invention without departing from the scope or spirit of the present invention. For example, features shown or described as one part of one embodiment may be applied to another embodiment to generate yet another embodiment. Therefore, it is expected that the present invention includes such modifications and variations that fall within the scope of the appended claims and their equivalents.

In the description of the present invention, orientation or position relationships indicated by terms “longitudinal”, “transverse”, “upper”, “lower”, “front”, “rear”, “left”, “right”, “vertical”, “horizontal”, “top”, “bottom” and the like are orientation or position relationships shown in the drawings, and these terms are merely for facilitating description of the present invention, but not for requiring that the present invention must be constructed and operated in a specific orientation, and thus, these terms cannot be understood as a limitation to the present invention. As used in the present invention, the terms “connected”, “connection” and “set” should be understood in a broad sense, for example, they may be fixed connection or detachable connection, they may be direct connection or indirect connection through an intermediate part; or they may be wired connection and wireless connection, or may be connection through a wireless communication signal. For those of ordinary skill in the field, the specific meanings of the terms may be understood according to the specific conditions.

The accompanying drawings show one or a plurality of examples of the present invention. The detailed description uses reference numerals and letters to refer to the features in the accompanying drawings. Similar numeral references in the drawings and description have been used to refer to the similar parts in the present invention. As used herein, the terms "first", "second" and "third" are used interchangeably to distinguish one component from another component, and are not intended to indicate the position or importance of individual components.

The present invention provides a power connector with a waterproof function. The power connector mainly includes a plug 1 and a socket 2 for connecting the plug 1. A waterproof piece 3 is slideably sleeve at the periphery of the plug 1, and the waterproof piece 3 can be fixedly connected to the socket 2 when the plug 1 is connected to the socket 2. The technical key points are as follows: sealing structures that can be matched with each are respectively arranged at one end of the waterproof piece 3 and the periphery of one end of the socket 2; an annular flange 31 with a diameter less than a maximum diameter of an outer edge of the plug 1 is arranged at the other end of the waterproof piece 3; a first sealing ring 4 matched with the annular flange 31 is mounted on the outer edge of the plug 1; when the waterproof piece 3 is mounted on the socket 2, the annular flange 31 can press against the first sealing ring 4 to embed the first sealing ring 4 into a gap between the annular flange 31 and the outer edge of the socket 2 to achieve the sealing effect. When the plug 1 and the socket 2 are energized and connected, the connection position is placed in the waterproof piece 3 to achieve the waterproof function.

Figure 2:
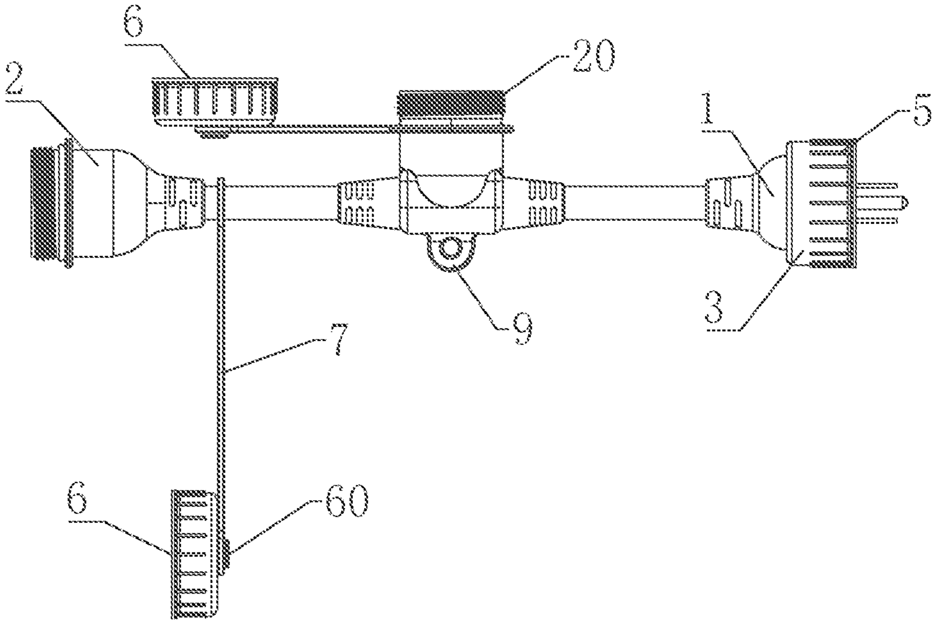
FIG. 2 is a schematic diagram of an A-direction structure of FIG. 1.

Referring to FIG. 1 and FIG. 2, the disclosed power connector serves as a power extension cable, the plug 1 and the socket 2 are connected through a power line, and an additional socket 2 is arranged in the middle of the power line and may serve as a branch of the power connector with the structure.

Figure 3:
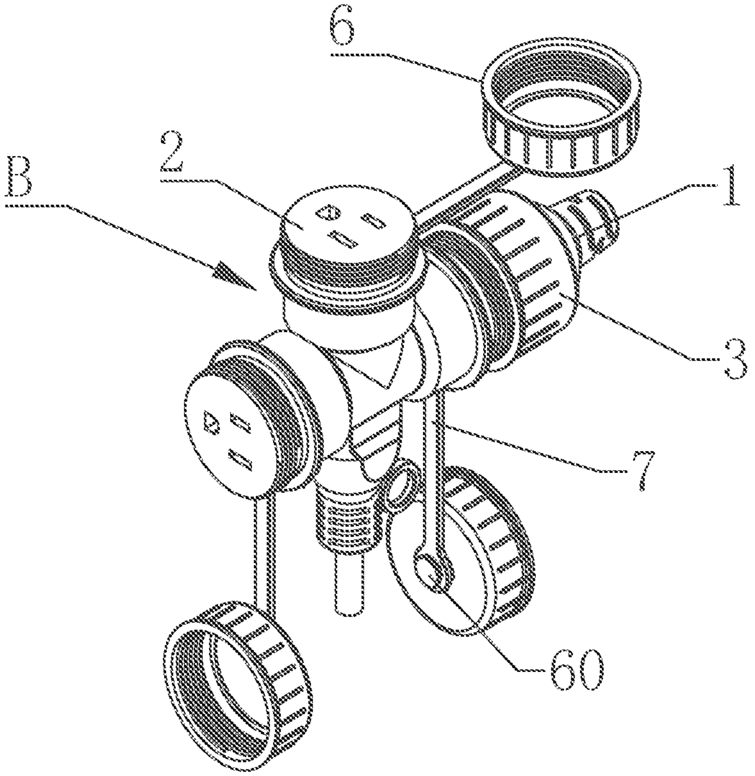
FIG. 3 is a three-dimensional structural schematic diagram of a power connector with a waterproof function according to the present invention serving as a drag power strip.
Figure 4:
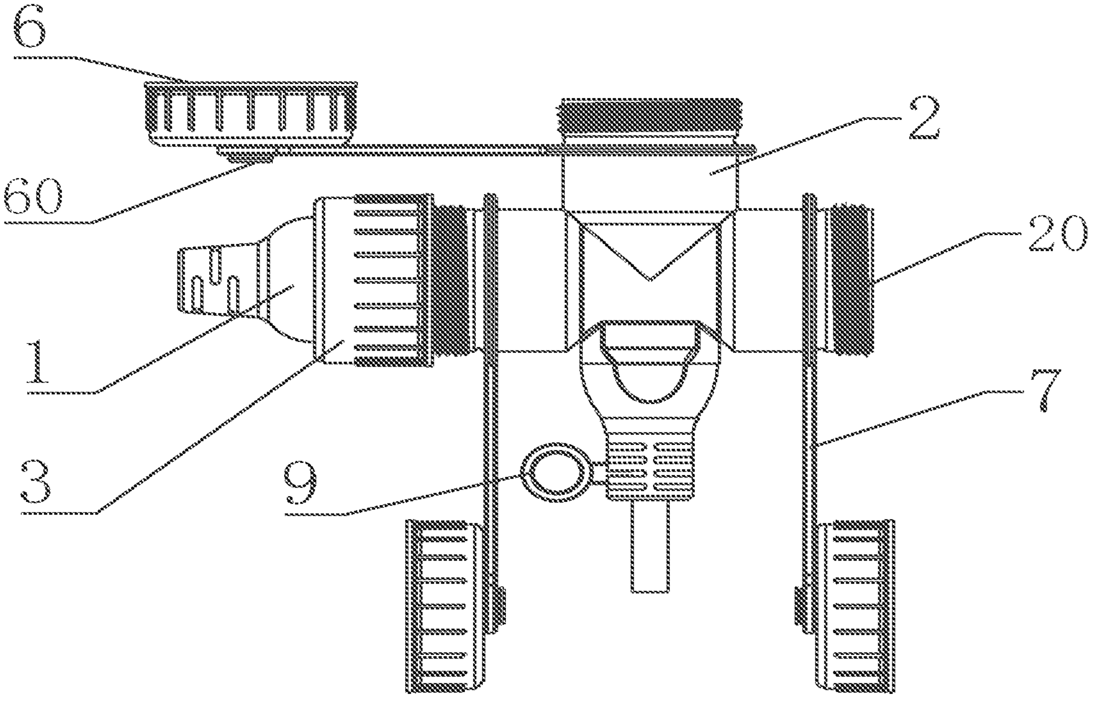
FIG. 4 is a schematic diagram of a B-direction structure of FIG. 3.
Figure 5:
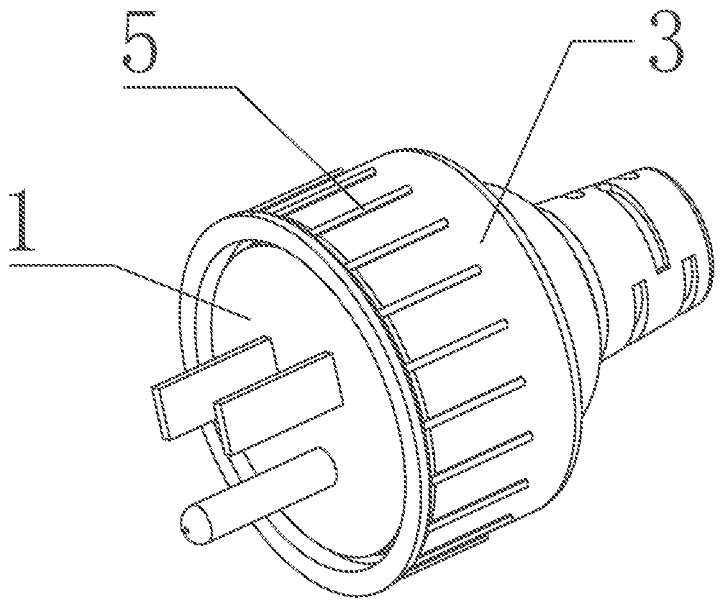
FIG. 5 is a three-dimensional structural schematic diagram when a waterproof piece according to the present invention is sleeved on a plug.
Figure 6:
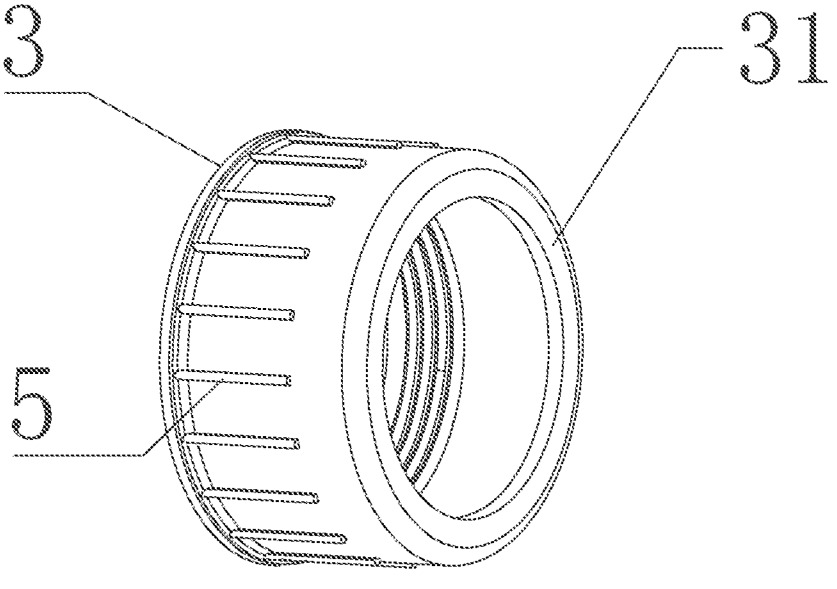
FIG. 6 is a structural schematic diagram of a waterproof piece and an annular flange thereof according to the present invention.
Figure 7:
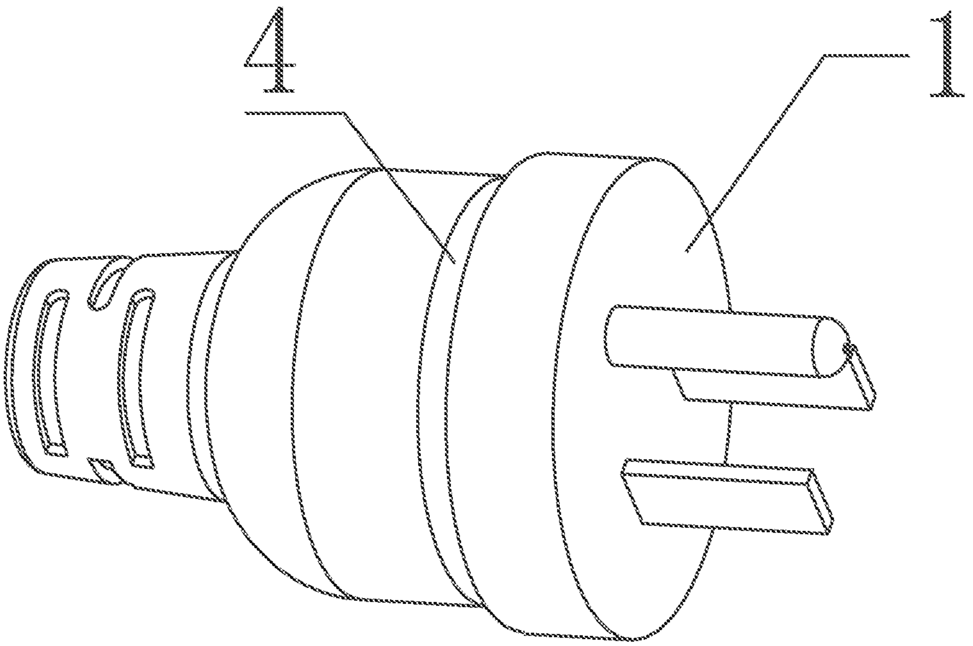
FIG. 7 is a structural schematic diagram of a plug and a first sealing ring thereof according to the present invention.
Figure 8:
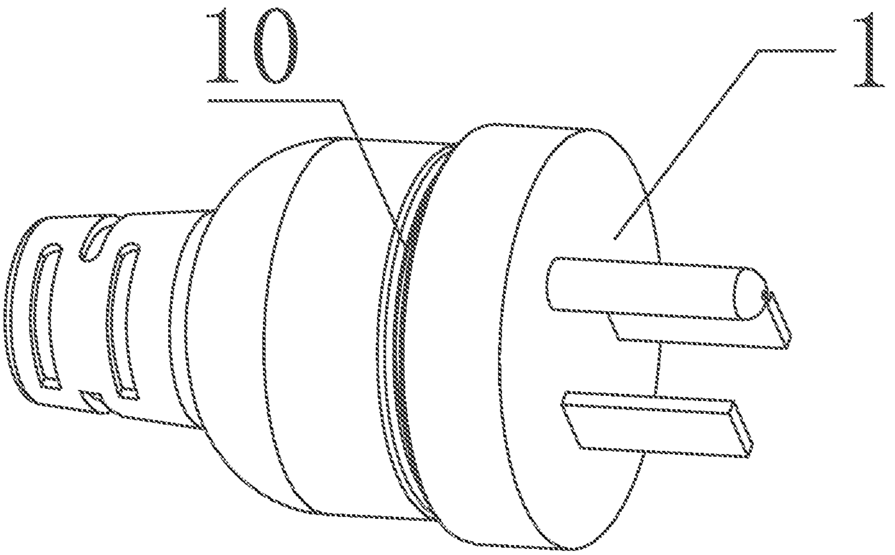
FIG. 8 is a structural schematic diagram of the sealing ring mounting groove in FIG. 7.

Referring to FIG. 3 and FIG. 4, the disclosed power connector serves as a drag power strip, wherein the number of the sockets 2 is preferably 3, so that the sockets can serve as three power branches.

The power extension cable and the drag power strip are provided with waterproof pieces 3. The waterproof pieces 3 and the sockets 2 have sealing structures matched with each other, so that a very good waterproof effect can be achieved.

Specifically, referring to FIG. 5, FIG. 6, FIG. 7 and FIG. 8, the annular flange 31 is integrally formed on the inner edge of the waterproof piece 3, and the first sealing ring 4 is positioned and mounted through the sealing ring mounting groove 10 formed in the outer edge of the plug 1, wherein the diameter of the annular flange 31 is less than the maximum diameter of the outer edge of the plug 1, so that the waterproof piece 3 can be prevented from sliding out of the plug 1. When the waterproof piece 3 slides towards the socket 2, the annular flange 31 can press against the first sealing ring 4, so that one end of the waterproof piece 3 with the annular flange 31 can achieve a sealing effect.

According to the above description, the solution provided by the present invention is: when the plug 1 is connected to the socket 2, the waterproof effect is achieved by the waterproof piece 3 sleeved on the plug 1; when a plurality of sockets 2 are provided, some of the sockets 2 are connected to the plug 1 to achieve the waterproof effect through the waterproof piece 3, the rest of idle sockets 2 do not achieve the waterproof function, and there is a risk of electric shock in the exposed jacks, so that in the technical solution of the present invention, when more than two sockets 2 are provided, the waterproof covers 6 that is in one-to-one correspondence with the sockets 2 are provided; the thread structure matched with the external thread structure 20 is arranged in the waterproof cover 6 so as to be mounted on the socket 2, and the waterproof cover 6 is arranged beside the corresponding socket 2 through the mounting ring belt 7; and one end of the mounting ring belt 7 is rotatably sleeved on the rotary knob 60 at the top of the waterproof cover 6, and the other end of the mounting ring belt 7 is sleeved on the peripheral surface of the socket, wherein the mounting ring belt 7 is made of the elastic material or flexible material, so that the waterproof cover 6 can align with the socket 2, and the manufacturing material is preferably a rubber material or may be other materials, such as plastic with elasticity, thereby reducing the manufacturing cost.

When the power connector is used in a special environment, for example, a waterlogged ground or a swimming pool, unnecessary accident caused by the fact that the whole power connector is immersed in water is avoided. A hanging ring 9 is arranged on one side of the socket 2, and the hanging ring 9 and the shell of the socket 2 are integrally formed for placing the power connector on the hanger, so that the power connector can be hung on the wall, and accidents caused by the fact that the whole power connector is immersed in water can be avoided.

The specific implementation manners of the sealing structure are described below in detail by the following embodiments.

Figure 9:
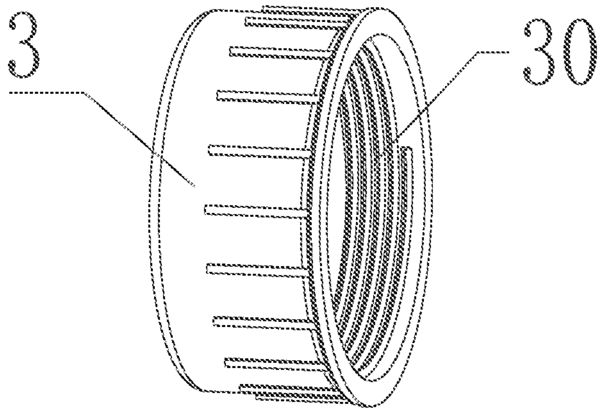
FIG. 9 is a structural schematic diagram of a waterproof piece according to a first embodiment of a sealing structure.
Figure 10:
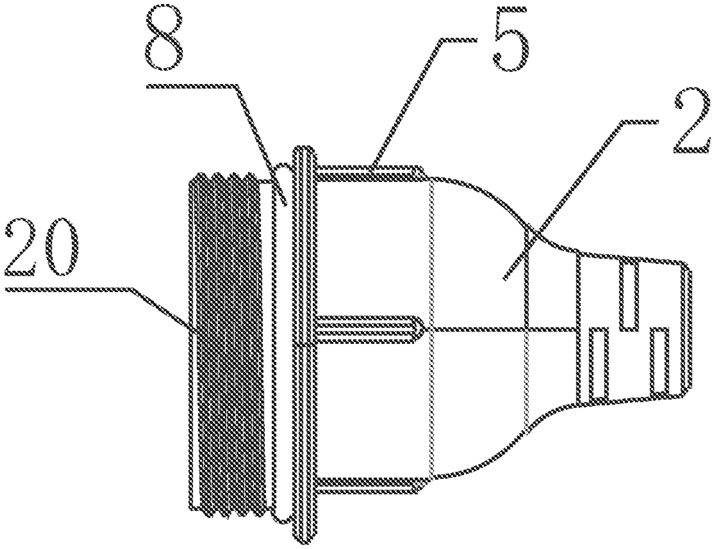
FIG. 10 is a structural schematic diagram of a socket according to a first embodiment of a sealing structure.

First Embodiment referring to FIG. 9 and FIG. 10, the sealing structures are an internal thread structure 30 arranged on an inner edge of one end, away from an annular flange 31, of the waterproof piece 3, and an external thread structure 20 arranged on an outer edge of one end of the socket 2. When the plug 1 is connected to the socket 2, the waterproof piece 3 slides towards the socket 2 and is screwed on the socket 2 through the external thread structure 20 and the internal thread structure 30, and the annular flange 31 presses against the first sealing ring 4 under the action, so that two ends of the waterproof piece 3 are sealed to obtain a waterproof piece 3 with an internal sealed space, and the joint of the plug 1 and the socket 2 is placed in the waterproof piece 3; meanwhile, the thread structure between the waterproof piece 3 and the socket 2 can prevent disconnection of the electrical connection structure locked by the plug 1 and the socket 2 under the action of the external force, thereby achieving the effect of locking the plug 1 on the socket 2.

To achieve more excellent waterproof property, a second sealing ring 8 is sleeved at the tail end of the internal thread structure 30. When the external thread structure 20 of the waterproof piece 3 is screwed into the internal thread structure 30 on the socket 2, the end face of one end, away from the annular flange 31, of the waterproof piece 3 can press against the second sealing ring 8, so that the waterproof effect can be further improved, thereby preventing a small amount of water from entering the sealing structure and avoiding electricity mixing.

As a further preferred solution of achieving the waterproof effect through the external thread structure 20 and the internal thread structure 30 of the embodiment, it is necessary to screw up the thread structure, the peripheral surface of the waterproof piece 3 and the peripheral surface of the socket 2 are smooth surfaces, which is not favorable for the thread structure to screw in and out. According to the present invention, several antiskid protruding edges 5 are arranged on the peripheral surface of the waterproof piece 3 and the peripheral surface of the socket 2, and the antiskid protruding edges 5 are arranged on the peripheral surface of the waterproof piece 3 and the peripheral surface of the socket 2 uniformly at uniform intervals, so that when the waterproof piece 3 is screwed into the socket 2, the situation that the thread structure is not screwed up due to hand slippage is avoided, and the waterproof piece 3 can be screwed out easily when the sealing structure is relieved.

Each antiskid protruding edge 5 located on the waterproof piece 3 extends along an axial direction of the waterproof piece 3 to form a strip-shaped structure, and each antiskid protruding edge 5 located on the socket 2 extends along an axial direction of the socket 2 to form a strip-shaped structure, thereby being matched with the rotating directions of the waterproof piece 3 and the socket 2 to increase the friction force.

Figure 11:
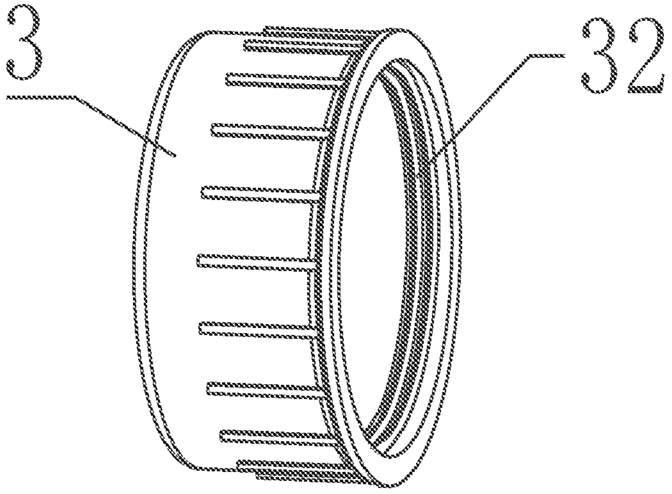
FIG. 11 is a structural schematic diagram of a waterproof piece according to a second embodiment of a sealing structure.
Figure 12:
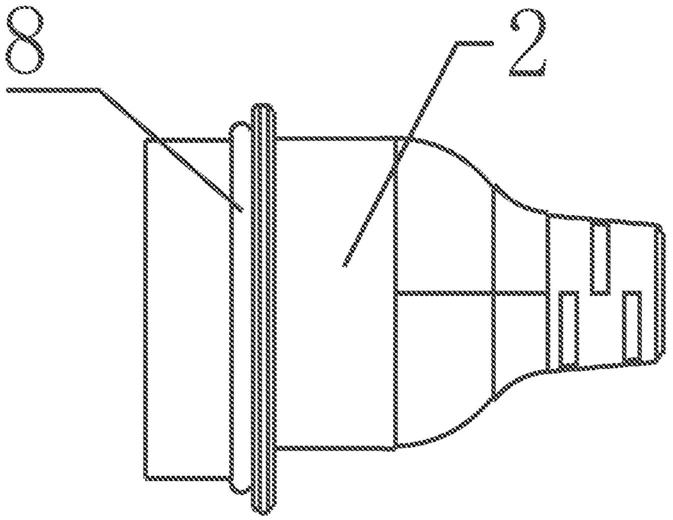
FIG. 12 is a structural schematic diagram of a socket according to a second embodiment of a sealing structure.

Second Embodiment referring to FIG. 11 and FIG. 12, the sealing structures are a waterproof ring groove 32 formed in an inner edge of one end, away from the annular flange 31, of the waterproof piece 3, and a second sealing ring 8 fixedly mounted on an outer edge of the socket 2. When the plug 1 and the socket 2 are connected, the waterproof piece 3 slides towards the socket 2, and the waterproof piece 3 is sleeved on the socket 2 and is embedded into the waterproof ring groove 32 through the second sealing ring 8, so that the waterproof piece 3 is fixed at the periphery of the socket 2; meanwhile, the annular flange 31 presses against the first sealing ring 4 under the action, so that through the mutual matching between the annular flange 31 and the first sealing ring 4 and the mutual matching between the waterproof ring groove 32 and the second sealing ring 8, two ends of the waterproof piece 3 are sealed to obtain a waterproof piece 3 with an internal sealed space, and the joint of the plug 1 and the socket 2 is placed in the waterproof piece 3; and when the second sealing ring 8 is in interference fit with the waterproof ring groove 32, the waterproof function is achieved in the waterproof piece 3, and the plug 1 is effectively locked on the socket 2, so that the failure of the electrical connection between the plug 1 and the socket 2 due to the external force can be avoided.

Compared with the first embodiment, the second embodiment achieves the waterproof effect through a simpler structure, but the waterproof and anti-falling stabilities are obviously inferior to those of the structure disclosed in the first embodiment. However, the fixing method of plugging and unplugging is more convenient than the thread screw-in and screw-out method, the effect of quick connection or quick disconnection can be achieved, and a more appropriate choice can be made according to the actual situation.

The above is merely illustrative of the preferred embodiments of the present invention and is not intended to limit the present invention, and various changes and modifications may be made by those skilled in the art. Any modifications, equivalent substitutions, improvements, etc. made within the spirit and scope of the present invention should be included within the protection scope of the present invention.

The invention claimed is:

1. A power connector with a waterproof function, comprising a plug and a socket for connecting the plug, wherein a waterproof piece is slideably sleeved at a periphery of the plug; an annular flange with a diameter less than a maximum diameter of an outer edge of the plug is formed on an inner edge of a first end of the waterproof piece; the plug comprising a first portion and a second portion connected to each other, a diameter of the first portion being greater than a diameter of the second portion, a first sealing ring matched with the annular flange is mounted on the outer edge of the plug; a diameter of the first sealing ring being less than the diameter of the first portion, the first sealing ring abutting against the first portion, sealing structures matched with each other are respectively arranged on an outer edge of the socket and an inner edge of a second end of the waterproof piece; and when the waterproof piece is mounted on the socket through the sealing structures, an internal space of the waterproof piece is sealed through the mutual matching between the annular flange and the first sealing ring and the mutual matching between the sealing structures; and wherein the sealing structures comprise a second sealing ring fixedly mounted on the outer edge of the socket and a waterproof ring groove formed in the inner edge of the second end of the waterproof piece, and the second sealing ring is in interference fit with the waterproof ring groove.

2. The power connector with the waterproof function according to claim 1, wherein a hanging ring for being placed on a hanger is arranged on one side of the socket.

3. The power connector with the waterproof function according to claim 1, wherein the sealing structures comprise an external thread structure arranged on the outer edge of the socket, and an internal thread structure arranged on the inner edge of the second end of the waterproof piece, the internal thread structure being matched with the external thread structure.

4. The power connector with the waterproof function according to claim 3, wherein antiskid protruding edges are respectively arranged on an outer edge of the waterproof piece and the outer edge of the socket circumferentially, each of the antiskid protruding edges located on the waterproof piece and extends along an axial direction of the waterproof piece to form a strip-shaped structure, and each of the antiskid protruding edges located on the socket and extends along an axial direction of the socket to form a strip-shaped structure.

5. The power connector with the waterproof function according to claim 3, wherein a sealing ring mounting groove for locating the first sealing ring is formed at the periphery of the plug.

6. The power connector with the waterproof function according to claim 5, comprising at least one socket, wherein each socket is provided with a waterproof cover with a built-in thread structure, and the thread structure on an inner edge of the waterproof cover is matched with the external thread structure on the socket.

7. The power connector with the waterproof function according to claim 6, wherein each waterproof cover is arranged beside the corresponding socket through a mounting ring belt, one end of the mounting ring belt is rotatably mounted at a top of the waterproof cover through a rotary knob, another end of the mounting ring belt is sleeved on a peripheral surface of the corresponding socket, and the mounting ring belt is made of an elastic material or a flexible material.

8. The power connector with the waterproof function according to claim 6, wherein the second sealing ring is sleeved at a tail end position of the external thread structure on each socket.

* * * * *